(12) United States Patent
Leung et al.

(10) Patent No.: US 8,056,845 B2
(45) Date of Patent: Nov. 15, 2011

(54) COMBINATION COFFEE GRINDER AND COFFEE STORAGE DEVICE

(75) Inventors: Chi-Wah Leung, Chaiwan (HK); Chi-Chung Fung, Chaiwan (HK); Wai-Hung Lau, Chaiwan (HK)

(73) Assignee: Simatelex Manufactory Co. Ltd., Chaiwan (HK)

( * ) Notice: Subject to any disclaimer, the term of this patent is extended or adjusted under 35 U.S.C. 154(b) by 132 days.

(21) Appl. No.: 12/567,881

(22) Filed: Sep. 28, 2009

(65) Prior Publication Data
US 2011/0073690 A1    Mar. 31, 2011

(51) Int. Cl.
  *B02C 19/00*    (2006.01)
(52) U.S. Cl. .................. 241/101.2; 241/101.5; 241/100
(58) Field of Classification Search .............. 241/101.2, 241/101.5, 100
  See application file for complete search history.

(56) References Cited

U.S. PATENT DOCUMENTS

| | | | | |
|---|---|---|---|---|
| 5,718,163 | A | * | 2/1998 | Termini ........................... 99/286 |
| 6,095,032 | A | * | 8/2000 | Barnett et al. ................... 99/286 |
| 2004/0129809 | A1 | * | 7/2004 | Siano et al. ...................... 241/92 |
| 2007/0063079 | A1 | * | 3/2007 | Ford ................................. 241/30 |
| 2009/0127363 | A1 | * | 5/2009 | Malykke ........................ 241/248 |
| 2010/0308137 | A1 | * | 12/2010 | Watkins ..................... 241/24.16 |

* cited by examiner

*Primary Examiner* — Faye Francis
(74) *Attorney, Agent, or Firm* — Leydig, Voit & Mayer, Ltd.

(57) ABSTRACT

In a combination coffee grinder and coffee storage device, a housing has a grinding chamber and a storage container located with the housing. The storage container has a removable airtight closure and the grinding chamber has grinding blades. A motor is located in the housing for driving the grinding blades. A pump, located in the housing, has an air connection to the storage container for evacuating air from the storage container. The pump is operated by the motor for evacuating air from the storage container while the motor is simultaneously driving the grinding blades

14 Claims, 9 Drawing Sheets

COMBINATION COFFEE GRINDER AND COFFEE STORAGE DEVICE

BACKGROUND TO THE INVENTION

1. Field of the Invention

The present invention relates to coffee been grinders and to coffee bean storage. More particularly, the current invention relates to a combination coffee grinder and coffee storage device.

2. Background Information

Coffee grinders (coffee mills) for grinding coffee beans into smaller coffee grinds are well known. Such devices comprise a chamber for holding coffee beans and a rotary grinding blade located in the chamber for cutting, chopping or grinding the beans into smaller pieces (coffee grinds) for use in coffee making machines.

Ideally coffee beans should be kept in a sealed container to avoid spoiling or staling of the beans. Beans left in the bean container of known coffee mills will spoil or stale because in known devices those containers are not sealed. The container may have a lid to prevent foreign matter entering the container but the lid.

SUMMARY OF THE INVENTION

In a combination coffee grinder and coffee storage device a housing has a grinding chamber and a storage container located with the housing. The storage container has a removable airtight closure and the grinding chamber has grinding blades. A motor is located in the housing for driving the grinding blades, and a pump located in the housing and has an air connection with the storage container for evacuating air from the storage container. The pump is operated by the motor for evacuating air from the storage container simultaneously with driving the grinding blades The storage container is removable from the base for ease of pouring beans from the container into the grinding chamber. The grinding chamber is removable from the base for ease of pouring coffee grinds from the grinding container into a brew basket. The grinding chamber may also be an integral part of the housing with only a single base for accommodating a removable storage container. The bean storage container may be integral with the housing and beans transferred to the grinding chamber using a scoop. Additionally, the storage container can also be used to store coffee grinds instead of coffee beans.

BRIEF DESCRIPTION OF THE DRAWINGS

The invention will now be described with reference to the accompanying drawings in which:—

Figure 1:
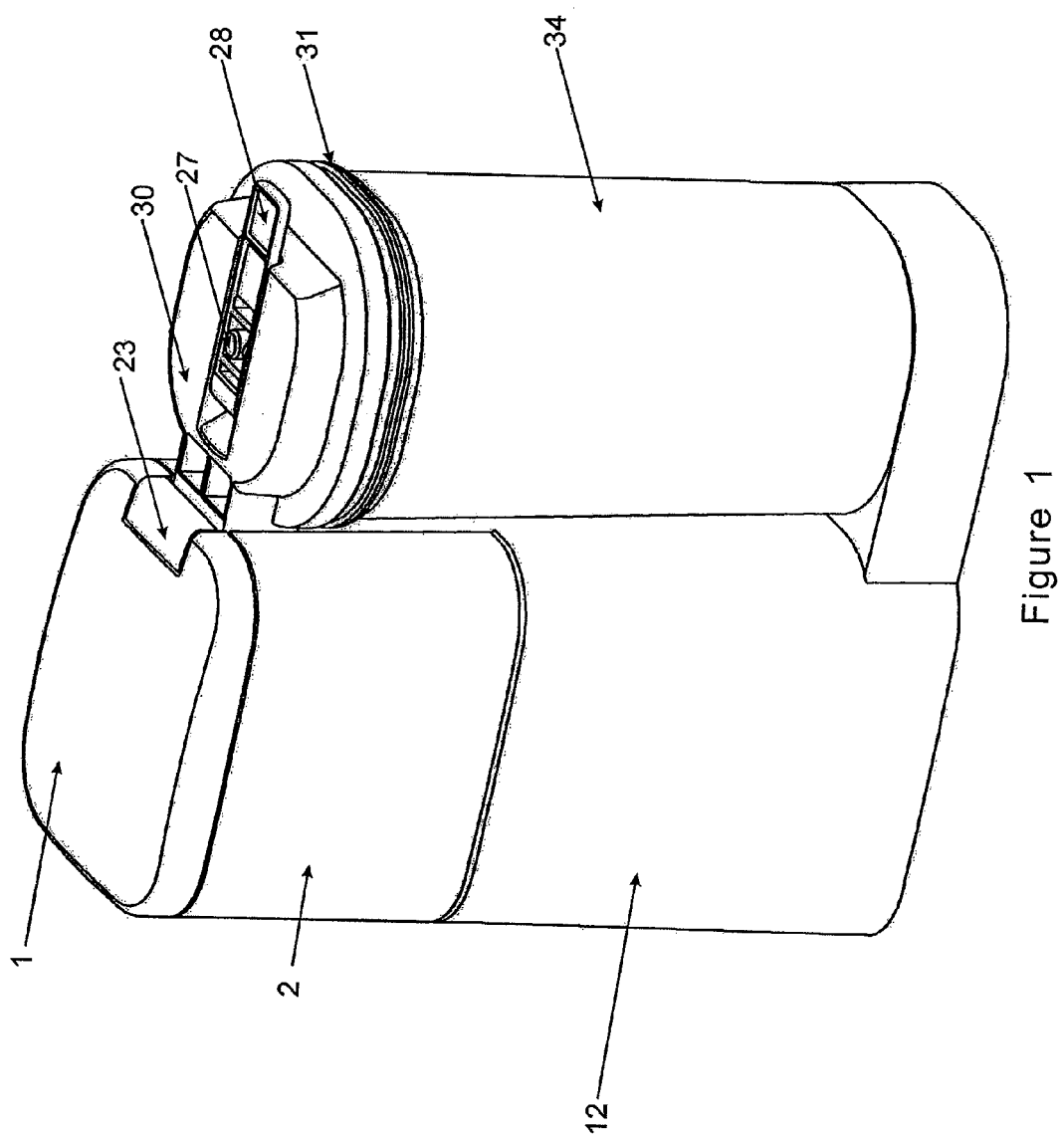
FIG. 1 is a front perspective illustration of a coffee bean grinder and storage device according to the invention.
Figure 2:
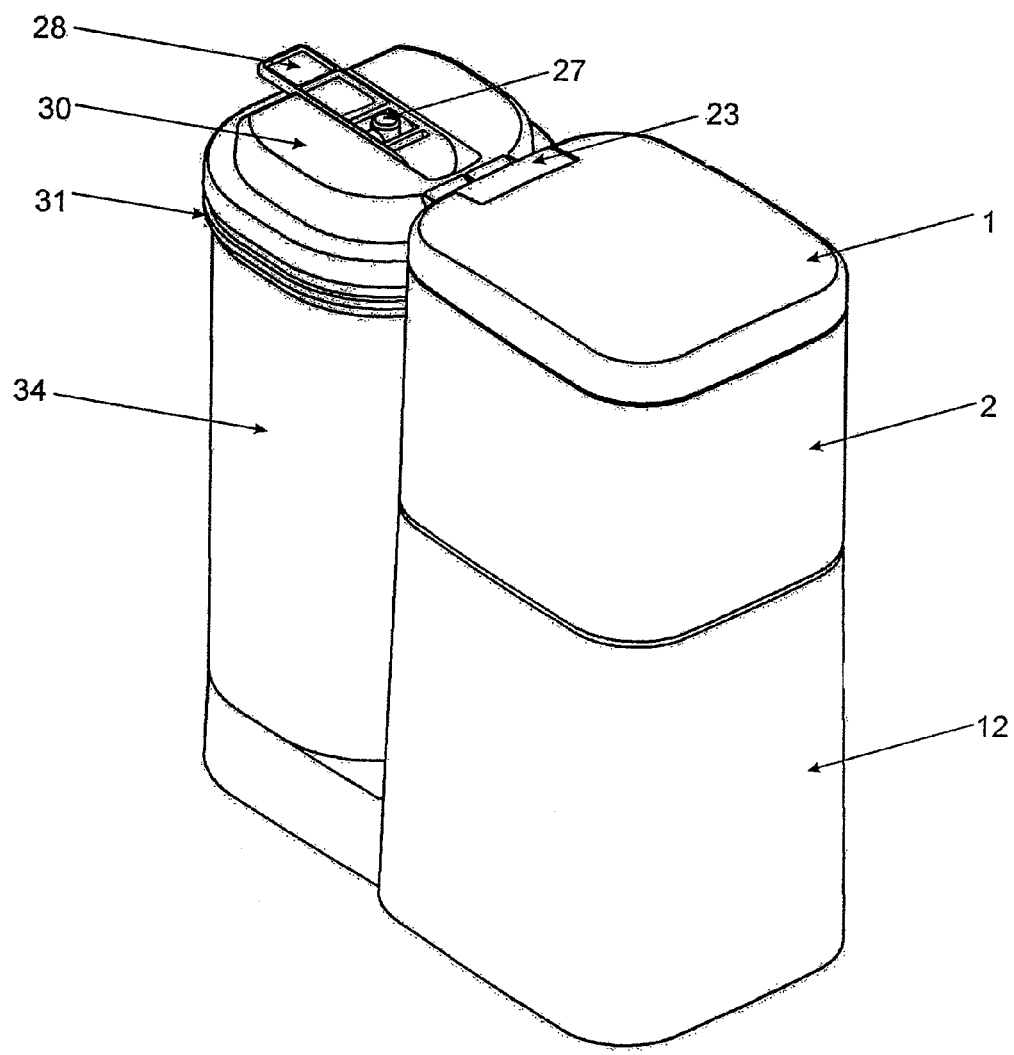
FIG. 2 is a back perspective illustration of the device.
Figure 3:
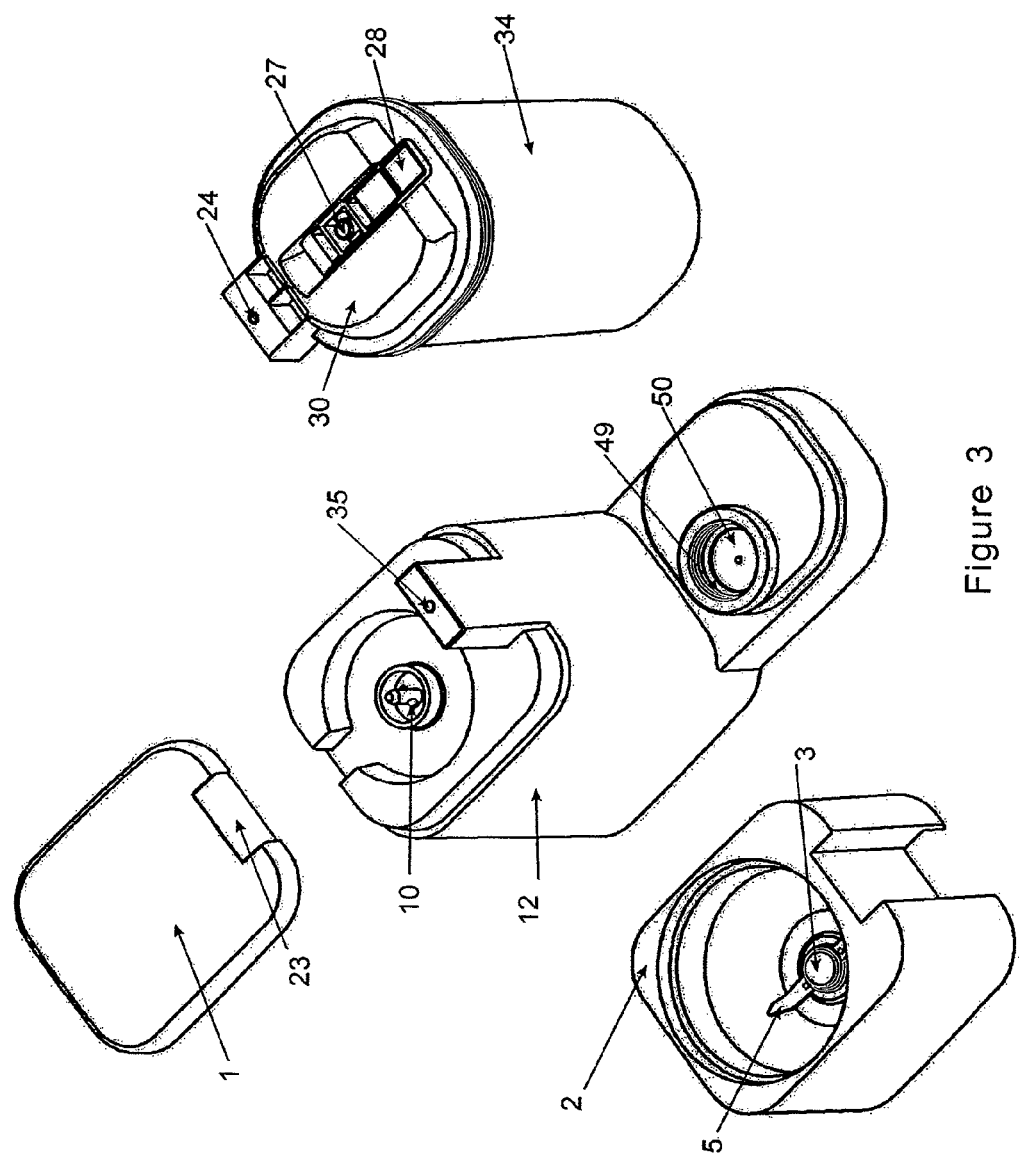
FIG. 3 is a perspective illustration of individual components of the device.
Figure 4:
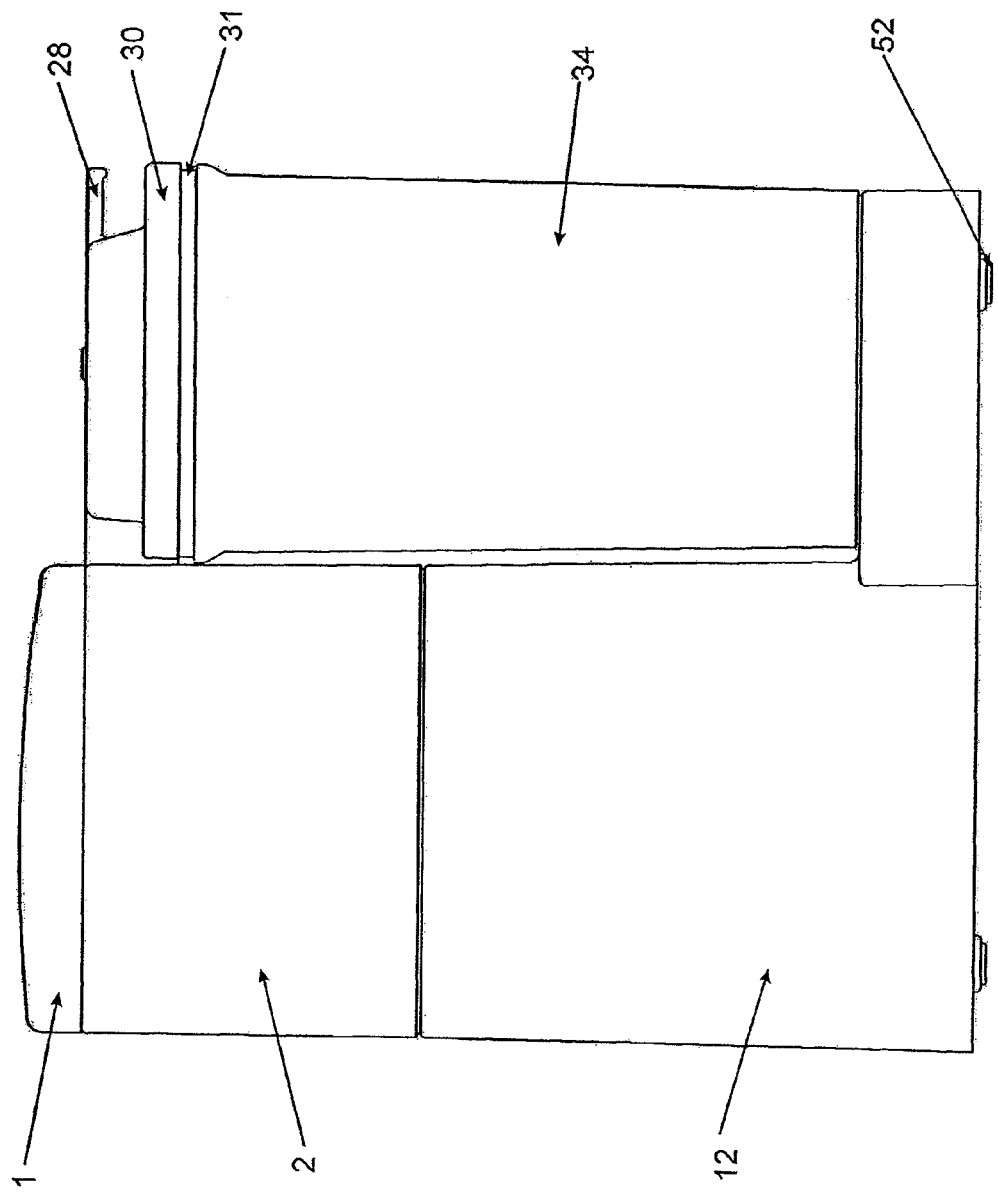
FIG. 4 is a front elevation illustration of the device.
Figure 5:
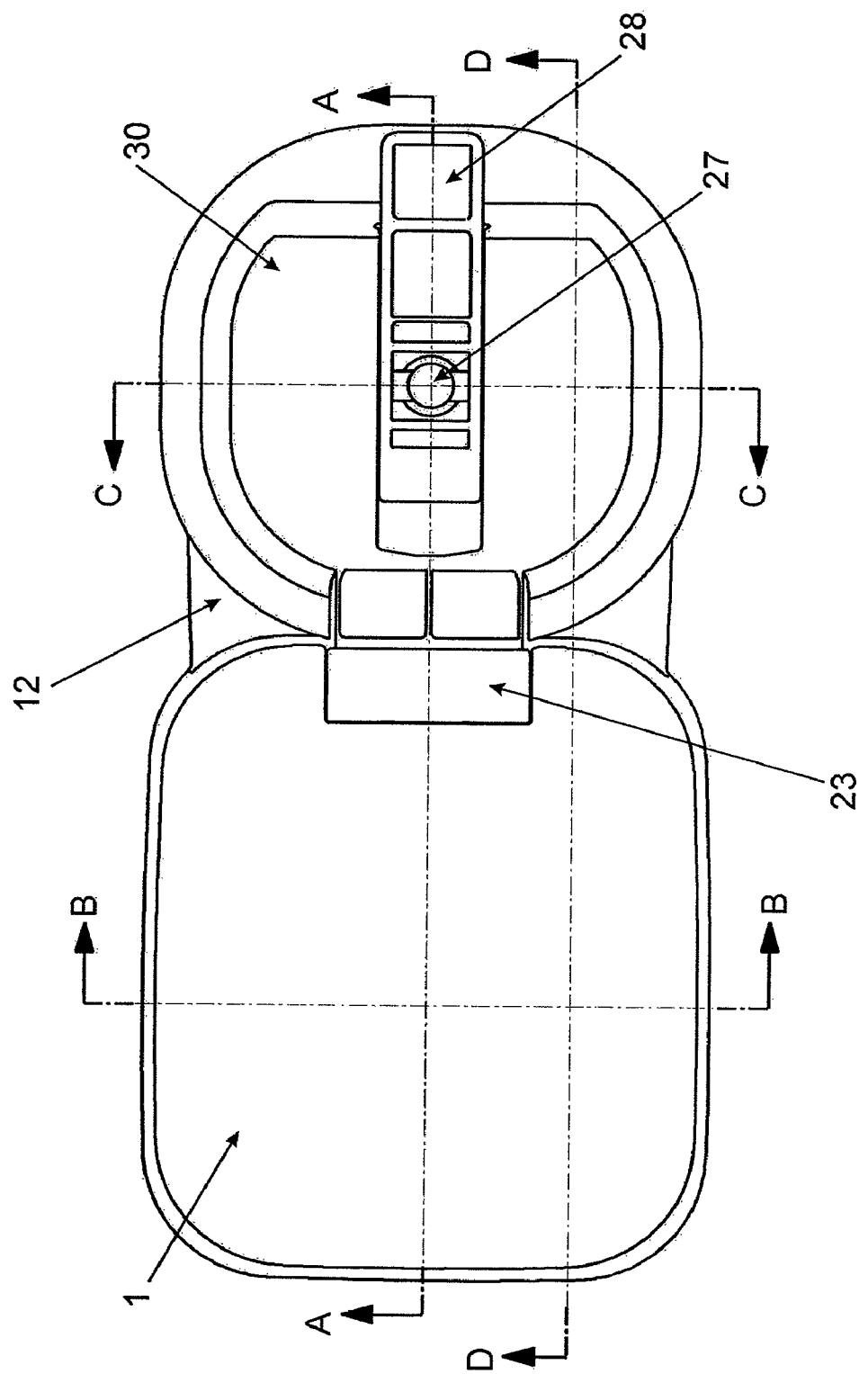
FIG. 5 is a top illustration of the device.
Figure 6:
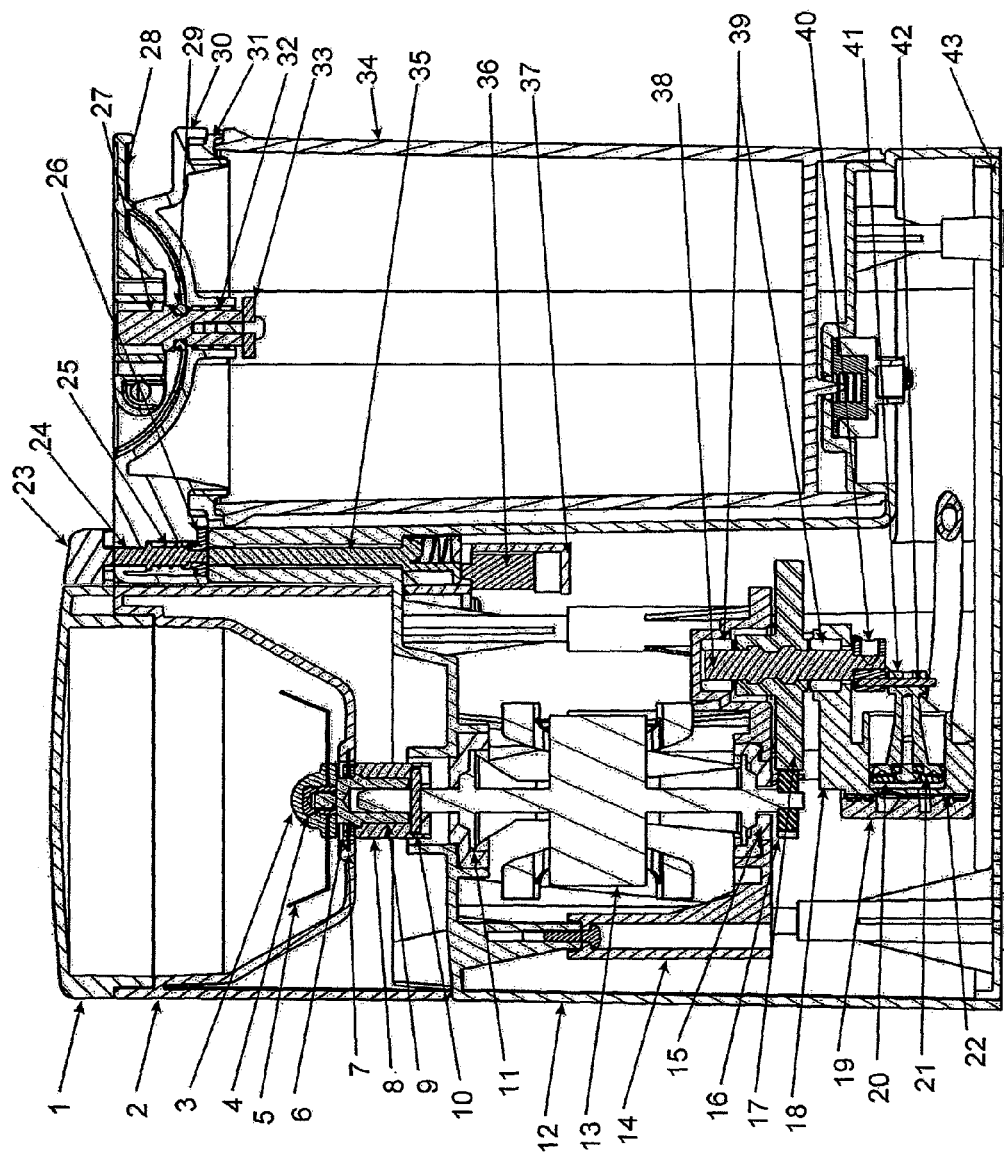
FIG. 6 is a section illustration through A-A of FIG. 5.
Figure 7:
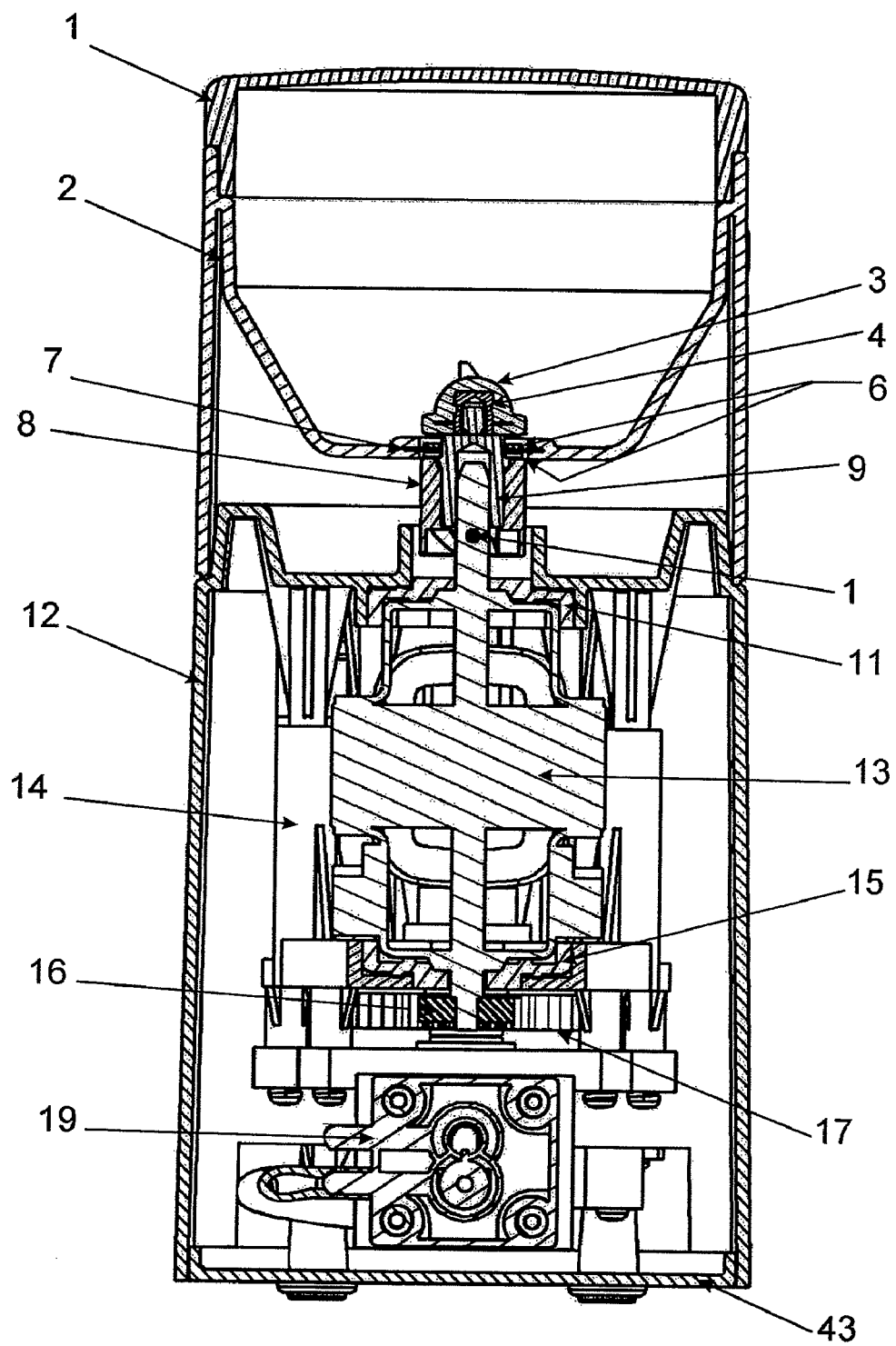
FIG. 7 is a section illustration through B-B of FIG. 5.
Figure 8:
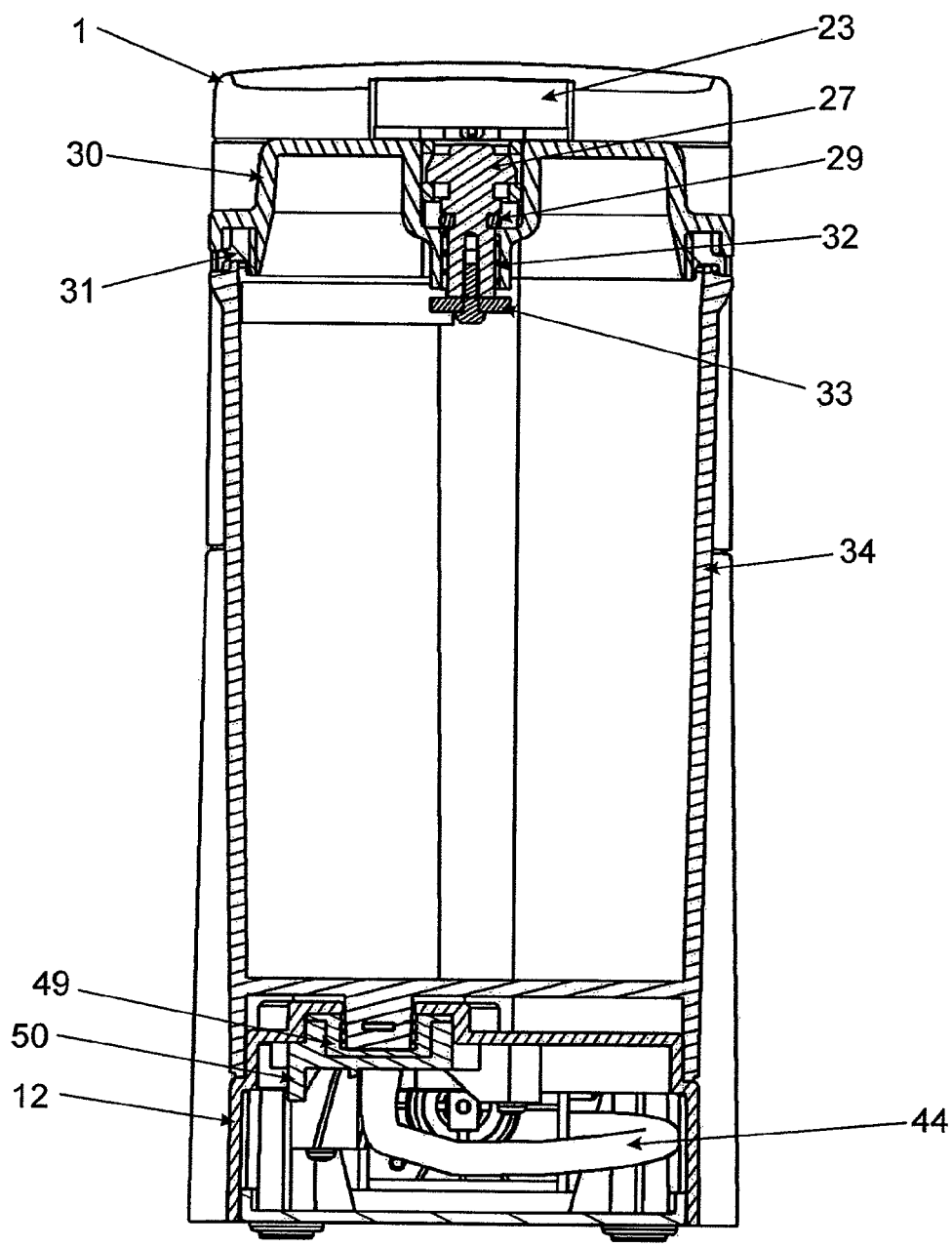
FIG. 8 is a section illustration through C-C of FIG. 5.
Figure 9:
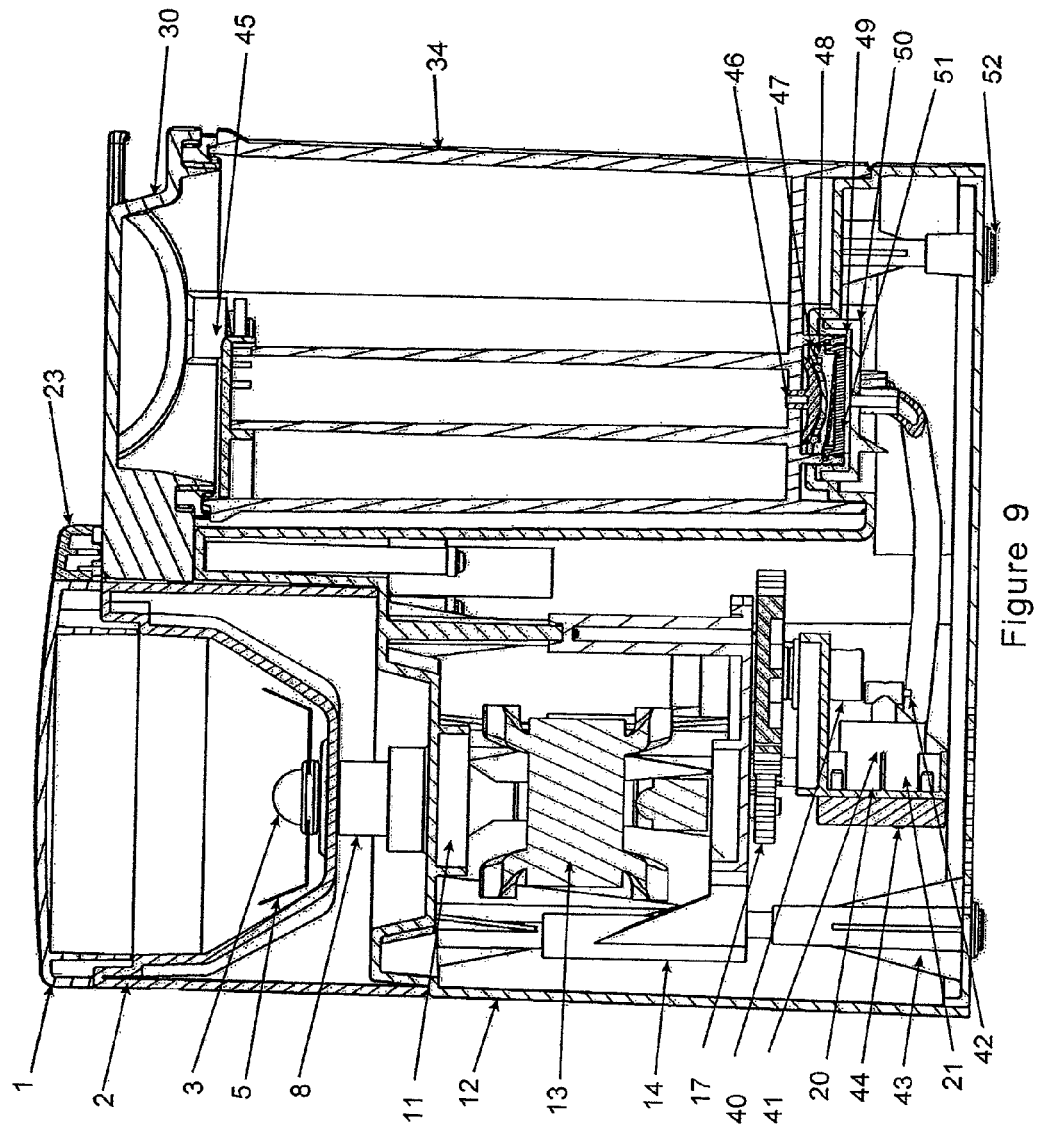
FIG. 9 is a section illustration through D-D of FIG. 5.

In the drawings the numerical labels identify the following parts of the device, 1. Grinding chamber lid
2. Grinder chamber
3. Blade cap
4. Nut
5. Grinder blade
6. Spacer
7. Washer insert
8. Grinder coupling
9. Coupling insert
10. Spring pin
11. Motor rubber top
12. Main body housing
13. Motor
14. Motor bracket
15. Motor rubber bottom
16. Motor pinion gear
17. Pump gear
18. Pump piston
19. Pump piston bottom
20. Pump cylinder spout base
21. Air pump foot valve
22. Pump piston diaphragm
23. On-off button
24. Safety shaft button
25. Spring B
26. Bean storage container lid extension
27. Vacuum release valve
28. Vacuum release handle
29. O ring A
30. Bean storage container lid
31. Gasket A
32. Spring C
33. Vacuum release valve base
34. Bean storage container
35. Safety shaft
36. Micro switch
37. Switch bracket
38. Pump gear shaft
39. Pump gear shaft bushes
40. Pump cam
41. Pump cylinder
42. Pump pin
43. Bottom cover
44. Suction tube
45. Vacuum cover
46. Evacuation valve
47. Evacuation valve cover
48. Spring A
49. Gasket B
50. Gasket B mount
51. Evacuation valve bracket
52. Rubber foot

DETAILED DESCRIPTION OF A PREFERRED EMBODIMENT OF THE INVENTION

Before a preferred embodiment of the invention is explained in detail, it is to be understood that the invention is not limited in its application to the details or arrangements set forth in the following description or illustrated in the drawings. The invention is capable of other embodiments and of being practiced or of being carried out in various ways. Also, it is to be understood that the phraseology and terminology used is for the purpose of description only and should not be regarded as limiting.

In its broadest embodiment the invention comprises a main housing unit 12 having side-by-side bases 54, 55 for respectively accommodating on one base 54 a coffee bean grinding chamber 2 and on the second bases 55 a coffee bean storage container 34. Within the housing 12 there is accommodated a motor 13 for driving a grinding blade 5 of the grinding chamber and a pump 56 for evacuating air from the bean storage container. In the preferred embodiment motor 13 drives both the grinding blade 5 and the pump 56. However, in other embodiments separate motors may be used. The advantage to using a single motor is that grinding of coffee beans and evacuation of the air from the bean storage container is done cheaply and simultaneously. Coffee beans are stored in the bean storage container under vacuum. When the lid 30 of the storage container is open to transfer beans to the grinding chamber the vacuum is lost. The lid of the storage container is closed and the container is placed back on the second base prior to grinding of the beans. When the motor is activated to grind the coffee beans the pump is also activated to evacuate air from the storage container and reestablish a vacuum therein.

Referring specifically to the drawings the coffee bean grinding and storage device has a main housing 12 that has a substantially rectangular footprint. On one side of the upper part of the housing 12 is a first base 54 for accommodating a grinding chamber 2 mounted on the housing. On the other side of the upper part of the housing is a second base 55 for receiving and mounting a bean storage container 34 on the housing. The two bases 54, 55 are separated by a vertical protrusion 57. The height of the one side of the housing having the first base 54 for the grinding chamber is higher than the second side of the housing having the second base 55 for accommodating the bean storage container. Thus, there is a greater volume within the housing below the first base 54 than below the second base 55. Within the housing volume below the first base 54 is housed a motor 13 for driving a blade 5 of the grinding chamber and also for driving, via a gear set, a pump 56 used for evacuating air from the bean storage container.

Within the housing volume below the first base is a motor bracket 14 to which the motor 13 is mounted in a vertical orientation about a vertical rotational axis concentric with the axis of the first base. The first base 54 has a recess 58 to aid location and support of the grinding chamber. In the center of the recess 58 is a circular flange surrounding an opening through which an upper end of the motor shaft is exposed. A spring pin 10 is located in the top end of the motor shaft. The base part of the grinding chamber 2 has a corresponding shape and arrangement to rest on the first base and recess. A rotatable cylindrical coupling 8 is located concentrically in the base of the grinding chamber and has a radial slot extending across it. The radial slot accommodates the spring pin 10 when the grinding chamber is located on the first base so that the motor shaft rotates the coupling 8. A coupling insert 9 is located within the coupling and surrounds the top end of the motor shaft. At the top end of the coupling insert 9 is a bolt on which the grinding blade 5 is located and secured by a nut 4. A grinding chamber lid 1 is accommodated on the top of the grinding chamber to close the grinding chamber. The lid of the grinding chamber has an on-off button 23 along one edge.

At the bottom end of the motor shaft is a pinion gear 16 that couples with a driving gear 17 for rotating air pump 56. The pump has a rotational input cam 40 for driving a pump piston 18 that is used to pump air. The pump may be of any suitable type known in the art. The inlet to the pump is coupled to a suction tube 44 through which air is drawn when the pump is operated. The tube 44 extends to an opening in a vertical walled recess 59 of the second base 55 that accommodates the bean storage container. When the pump is operated air is drawn through the opening and is expelled by the pump within the housing to be vented naturally to the outside air. A circular gasket 49 is located about the inner periphery of the vertical walled recess 59. The gasket 49 is held in placed by a gasket mount 50. The base of the bean storage container 34 is arranged to mount on the second base 55 of the housing 12. In the base of the bean storage container is a cylindrical flange 60 that locates within the vertical walled recess 59 when the bean storage container is mounted in its location on the second base. The other edge of the cylindrical wall engages with the gasket 49 to form an airtight seal between the flange and the wall of the recess 59. Located in the base of the container, within the cylindrical flange, is a spring-operated evacuation valve 46. Within the storage container an internal wall 60 surrounds the evacuation valve 46 and is caped with a vacuum cover 45 have a series of apertures 61 in it. The internal wall 60 and cover 45 define a vacuum void 62 with the internal contain which is free of coffee beans (or grinds) to prevent then being sucked into and blocking the evacuation valve. When the pump is operated air is drawn through the hose, which opens the spring-operated evacuation valve 46 to evacuate the air formed by the bean storage container mounted on the second base. The bean storage container has an airtight closure lid 30 such that operation of the pump drawing air from within the container causes a vacuum within the bean storage container.

The lid 30 of the bean storage container has a lower circular channel accommodating a circular gasket 31 that abuts the top lip of the bean storage container wall when the lid is in place on the bean storage container. The gasket provides an airtight seal so that when air is evacuated from the bean storage container the lid is held in place by vacuum pressure. A top surface of the lid has a hemispherical recess. Concentric with the hemispherical recess is an opening through the lid in which is located a vacuum release valve 27. The vacuum release valve 27 attaches to a hinged vacuum release lever pivotally located within the hemispherical recess and having an overhanging release handle 28. In order to remove the lid from the bean storage container when the container is under vacuum the release handle 28 is lifted upwards opening the vacuum release valve 27 thus releasing the vacuum within the storage container and enabling the lid to be removed.

A hollow vertical column of the housing 12 separates the grinding chamber 2 and bean storage container 34 when both are located on the housing. Movably located within the vertical column is a safety shaft 35 which activates a micron switch 36 for operating the motor 13 and thus turning the grinding blade 5 and activating the pump 56 for evacuating air from the bean storage container. The bean storage container lid has an extension portion 26 that abuts at the top of the vertical column when the lid 30 is in position on the bean storage container and the container is in position on the housing base. Within the lid extension 26 is a second safety shaft 24 that aligns with the first shaft 35 within the vertical column. When the grinding chamber lid 1 is on the grinding chamber and the grinding chamber is located on the housing base the on/off switch button 23 portion of the grinding chamber lid abuts over the top of the bean storage container lid extension 26. A detent on the bottom of the on/off button 23 aligns with the second safety shaft 24 within the extension 26. Thus, only when the lids 1, 30 of both the grinding chamber and the bean storage container are in place and the grinding chamber 2 and bean storage container 34 are in position on the respective bases can the motor be operated by depressing the on/off button 23 which in turn moves the second safety shaft 24 which in turn depresses the safety shaft 35 within the column which activates the micro switch 36 and starts the motor 13.

Thus, according to the above description, there is a preferred embodiment of a coffee grinder and storage device which has both a grinding chamber for grinding coffee and a storage contain for coffee beans. The device grinds coffee beans whilst simultaneously evacuating air from a bean storage container in order to keep beans fresh. The design provides for the grinding of coffee beans and the storage of fresh coffee beans in a suitable container which keeps the coffee beans fresh. The bean storage container is detachable to allow for ease of pouring the beans into the grinding chamber. The grinding chamber uses a SSL blade-type grinding system known in the art. The grinding chamber is removable from the base for ease of pouring coffee grinds from the grinding container into a brew basket. Both the grinding blades and the air evacuation pump for creating a vacuum within the storage container are operated simultaneously by a single motor activated by a single on/off switch. The lid of the bean storage container is vacuum sealed and has a vacuum release in order to release the vacuum for opening.

The skilled addressee will appreciate that various modifications of the above-described embodiment are obvious. For example, in the above-described embodiment the grinding chamber is removable from the base for ease of pouring coffee grinds from the grinding container into a brew basket. In alternative embodiments the grinding chamber may be an integral part of the housing with only a single base for accommodating a removable storage container. In yet a further embodiment the bean storage container may be integral with the housing and beans transferred to the grinding chamber using a scoop. Additionally, where reference is made to coffee bean storage, the airtight/vacuum container can also be used to store coffee grinds.

The invention claimed is:

1. A combination coffee grinder and coffee storage device comprising:
    a housing having a grinding chamber and a storage container located with the housing, wherein
        the storage container has a removable airtight closure, and
        the grinding chamber has grinding blades;
    a motor located in the housing and driving the grinding blades; and
    a pump located in the housing and having an air connection to the storage container for evacuating air from the storage container, wherein the pump is operated by the motor for evacuating air from the storage container while simultaneously driving the grinding blades.

2. The combination coffee grinder and coffee storage device of claim 1, wherein
    the airtight closure is secured to the storage container by vacuum pressure within the container; and
    the closure has a manually operated valve for releasing a vacuum within the container.

3. A combination coffee grinder and coffee storage device comprising:
    a housing having a grinding chamber and a storage container located with the housing, wherein
        the storage container has a removable airtight closure, and
        the grinding chamber has grinding blades,
    a motor located in the housing and driving the grinding blades; and
    a pump located in the housing and having an air connection to the storage container for evacuating air from the storage container, wherein
        the storage container has a base and an evacuation valve located in the base, and
        the evacuation valve communicates with the pump for evacuating air from the storage container and prevents air from entering the container.

4. The combination coffee grinder and coffee storage device of claim 3, wherein
    the housing has a base,
    the storage container is removably located on the base, and
    the base has a coupling for connecting the valve with the pump when the storage container is located on the base.

5. The combination coffee grinder and coffee storage device of claim 4, wherein
    the coupling comprises a circular recess in the base and a gasket located about a periphery of the circular recess; and
    the storage container has a circular flange locatable within the recess engaging the gasket.

6. The combination coffee grinder and coffee storage device of claim 5 including an opening in the circular recess of the base, the opening being connected with the pump by a air passage such that air is drawn through the opening by the pump.

7. The combination coffee grinder and coffee storage device of claim 3, wherein
    the airtight closure is secured to the storage container by vacuum pressure within the container; and
    the closure has a manually operated valve for releasing a vacuum within the container.

8. A combination coffee grinder and coffee storage device comprising:
    a housing having a grinding chamber and a storage container located with the housing, wherein
        the storage container has a removable airtight closure, and
        the grinding chamber has grinding blades;
    a motor located in the housing and driving the grinding blades; and
    a pump located in the housing and having an air connection to the storage container for evacuating air from the storage container, wherein
        the housing has a first base and a second base,
        the grinding chamber is removably located on the first base,
        the first base has a first coupling for connecting the grinding blades with the motor when the grinding chamber is located on the first base,
        the storage container is removably located on the second base, and
        the second base has a second coupling for connecting the storage container to the pump when the storage container is located on the second base.

9. The combination coffee grinder and coffee storage device of claim 8, wherein
    the first coupling comprises an opening in the first base and a flange surrounding the opening, an output shaft of the motor being located in the opening;
    the grinding chamber has a chamber base with a rotatable coupling located concentrically in the chamber base; and
    the rotatable coupling is located within the flange and engages the motor shaft when the grinding chamber is located on the first base.

10. The combination coffee grinder and coffee storage device of claim 8, wherein
    the second coupling comprises a circular recess in the first base and a gasket located about a periphery of the circular recess; and the storage container has a circular flange locatable within the recess engaging the gasket.

11. The combination coffee grinder and coffee storage device of claim 10 including an opening in the circular recess of the first base, the opening being connected to the pump by an air passage such that air is drawn through the opening by the pump.

12. The combination coffee grinder and coffee storage device of claim 8, wherein
the airtight closure is secured to the storage container by vacuum pressure within the container; and
the closure has a manually operated valve for releasing a vacuum within the container.

13. A combination coffee grinder and coffee storage device comprising:
a housing having a grinding chamber and a storage container located with the housing, wherein
the storage container has a removable airtight closure, and
the grinding chamber has grinding blades;
a motor located in the housing and driving the grinding blades;
a pump located in the housing and having an air connection to the storage container for evacuating air from the storage container, wherein
the housing has a vertical extension between the grinding chamber and the storage container,
the extension houses a first switch shaft, and
the airtight closure of the storage container abuts the top of the vertical extension and has a second switch shaft; and
a grinding chamber lid abutting the top of the airtight closure and having a switch button, wherein the motor can only be operated by simultaneous operation of the switch button, and the first and second switch shafts.

14. The combination coffee grinder and coffee storage device of claim 13, wherein
the airtight closure is secured to the storage container by vacuum pressure within the container; and
the closure has a manually operated valve for releasing a vacuum within the container.

* * * * *